United States Patent Office.

KILIAN EGGER, OF SOUTH CORTLAND, NEW YORK.

*Letters Patent No.* 58,232, *dated September* 25, 1866; *reissue No.* 2,505, *dated March* 12, 1867.

IMPROVED METHOD OF EXTRACTING CREAM FROM WHEY.

The Schedule referred to in these Letters Patent and making part of the same.

TO ALL WHOM IT MAY CONCERN:

Be it known that I, KILIAN EGGER, of the town of South Cortland, in the county of Cortland, and State of New York, have invented a new and improved Process for Extracting Cream from Whey after cheese curd has been separated from it, of which the following is a full, clear, and exact description.

After the cheese curd has been separated from the whey I put the latter in tanks, which may be about one foot deep, more or less, and to ten gallons, more or less, of whey, add a handful of salt. I prefer that the tanks above mentioned should be made of zinc or have zinc bottoms, but they may be made of other material, provided it is a good conductor of heat, or that the bottoms are of good conducting material. These tanks containing the whey I place in a cool place, preferring to stand them in running water or upon a cool cellar floor, the cooler the better, so that the temperature of the whey will be from 50° to 60° Fahrenheit, preferably in the neighborhood of 55° or thereabouts. I let the whey in the cooling bottom tanks, thus placed, stand, say from twenty-two to twenty-four hours, when the cream is ready for skimming. It should be kept at the same degree of coolness, say 55° or thereabouts for churning, which is cooler than is ordinarily the case in churning cream. To keep the tanks in proper order they should be scalded before or after every performance of the process to secure their being sweet and clean. The churning may be effected in any of the ordinary methods, when the butter produced by this, my improved process, will be found of superior quality.

What I claim as my invention or discovery is—

The process above described for extracting the cream from the whey, substantially as specified.

KILIAN EGGER.

Witnesses:

AMOS L. KENNEY,

CHANCEY STEVENS.